United States Patent
Pavageau et al.

(10) Patent No.: US 12,299,219 B2
(45) Date of Patent: May 13, 2025

(54) DATA ENTRY DEVICE INTENDED TO BE AFFIXED TO A TOUCH PANEL OF A TERMINAL AND CORRESPONDING ENTRY METHOD

(71) Applicant: BANKS AND ACQUIRERS INTERNATIONAL HOLDING, Suresnes (FR)

(72) Inventors: Stéphane Pavageau, La Roche de Glun (FR); Alain Coussieu, Flaviac (FR); Olivier Blanc, Pont de l'Isère (FR)

(73) Assignee: BANKS AND ACQUIRERS INTERNATIONAL HOLDING, Suresnes (FR)

( * ) Notice: Subject to any disclaimer, the term of this patent is extended or adjusted under 35 U.S.C. 154(b) by 0 days.

(21) Appl. No.: 18/034,212

(22) PCT Filed: Oct. 29, 2021

(86) PCT No.: PCT/EP2021/080215
§ 371 (c)(1),
(2) Date: Apr. 27, 2023

(87) PCT Pub. No.: WO2022/090517
PCT Pub. Date: May 5, 2022

(65) Prior Publication Data
US 2023/0400940 A1    Dec. 14, 2023

(30) Foreign Application Priority Data
Oct. 30, 2020 (FR) .................................... 20/11165

(51) Int. Cl.
*G06F 3/044* (2006.01)
*G06F 3/039* (2013.01)

(52) U.S. Cl.
CPC ............ *G06F 3/0393* (2019.05); *G06F 3/044* (2013.01)

(58) Field of Classification Search
CPC .............................. G06F 3/0393; G06F 3/044
See application file for complete search history.

(56) References Cited

U.S. PATENT DOCUMENTS 10,852,858 B2 * 12/2020 Paik .................... G06F 3/04162
2011/0248947 A1 * 10/2011 Krahenbuhl .......... G06F 1/1671
345/174

(Continued)

FOREIGN PATENT DOCUMENTS

| EP | 3451139 A1 | 3/2019 |
| EP | 3582090 A1 | 12/2019 |

OTHER PUBLICATIONS

Feb. 14, 2022 International Search Report issued in International Patent Application No. PCT/EP2021/080215.

(Continued)

*Primary Examiner* — Towfiq Elahi
(74) *Attorney, Agent, or Firm* — Oliff PLC

(57) ABSTRACT

A data input device intended to be affixed to a capacitive touch screen of a terminal includes: a substantially parallelepipedal plate including a lower surface, which is substantially planar, for affixing the device to the touch screen, and an upper surface including an array of input zones that form a keyboard and are configured to enable a finger of a user to be detected by the touch screen when the device is affixed thereto; and at least two contact pads, which are electrically conductive and arranged on the lower surface, and each electrically connected to means for discharging, towards the outside of the touch screen, electric charges concentrated at the contact pads when the device is affixed to and held on the touch screen.

10 Claims, 13 Drawing Sheets

(56) References Cited

U.S. PATENT DOCUMENTS

2016/0048261 A1\* 2/2016 Argiro .................. G06F 3/0393
                                                                345/174
2018/0067638 A1\* 3/2018 Klein .................... G06F 3/0346
2019/0066108 A1   2/2019 Berthiaud et al.
2020/0026392 A1\* 1/2020 Pavageau ............ G06F 3/04886

OTHER PUBLICATIONS

May 2, 2023 International Preliminary Report on Patentability issued in International Patent Application No. PCT/EP2021/080215.

\* cited by examiner

DATA ENTRY DEVICE INTENDED TO BE AFFIXED TO A TOUCH PANEL OF A TERMINAL AND CORRESPONDING ENTRY METHOD

FIELD OF THE INVENTION

The present technique relates to the field of data entry on terminals (mobile phones, computers, tablets, payment terminals, automated cash dispensers (ACDs), communication terminals, which are temporarily transformed into payment terminals, etc.).

More specifically, the present technique concerns a data entry device intended to be affixed to a touch panel of a terminal (also called "touch screen")

This technique applies in particular, but not exclusively, to the entry of confidential codes or personal identification codes (or PIN code for "Personal Identification Number") on a touch panel of a terminal, for example for visually impaired people.

PRIOR ART

Touch screens are widely used to enter data into computerized data processing systems, hereinafter referred to as terminals. For example, mobile phones, computers, tablets, or even payment terminals and automated cash dispensers (ACDs) have touch screens to facilitate the data entry by the users.

To make an entry, a user can select one or more keys (each associated with an alphanumeric character) on a virtual keyboard displayed on the touch screen, using a finger or a stylus. Thus, it is no longer necessary to have a physical keyboard to enter data. However, entering data with a virtual keyboard has drawbacks, in particular for visually impaired people, but also for people who are technophobic or not familiar with digital uses. Thus, unlike physical keyboards, virtual keyboards are displayed on a flat screen and do not allow some users (in particular visually impaired people) to spatially find their way around the virtual keys.

This drawback is particularly troublesome for payment terminals or automated cash dispensers (ACDs) which have a touch screen. Indeed, when a user uses his bank card to make a payment or to withdraw banknotes, he must enter his PIN code to authenticate himself. It is not possible for a visually impaired person to enter his PIN code on a virtual keyboard displayed on a touch screen.

In many countries there are already guidelines requiring traders and bankers to provide a solution for visually impaired people.

A state-of-the-art solution is known which consists in always providing a physical electronic keyboard connected to a payment terminal, even if a virtual keyboard is available on the touch screen. The manufacturing cost of payment terminals or automated cash dispensers (ACDs) thus equipped is therefore increased, without the solution being really interesting, in particular from the technical and aesthetic points of view. Indeed, the physical keyboard intended for visually impaired people must be secure to avoid hacking, increasing the cost, and this keyboard is generally not aesthetically integrated into the touch solution.

To overcome at least some of these drawbacks, the applicant has developed a data entry form to be affixed to the touch panel, as described in the patent application FR 3 070 519. This entry form, generally made of transparent plastic, reproduces a conventional keyboard having ten numeric keys and function keys.

As described in this patent application, the entry form comprises, on its lower face, at least two electrically conductive contact pads which allow, when the entry form is affixed to the touch panel, interacting with the touch panel during capacitive scanning cycles of the latter. The terminal can therefore detect the affixing and the orientation of the entry form thanks to the detection of the contact pads. Moreover, knowing the orientation of the entry form on the touch panel, and therefore the position on the touch panel of each of the entry areas (forming entry keys) of the form, the terminal can, each time it detects a user's finger tap on the touch panel through one of the entry areas of the form, determine to which keyboard character or keyboard function this tap corresponds.

A drawback of this solution lies in the fact that the contact pads located under the form, which allow the detection of the latter by the terminal, are not efficiently/accurately detected by all the types of terminals. Indeed, depending on the different sensitivities of the touch panels and the implemented self-calibration software, these contact points may not be detected or generate interference and are therefore not recognized as constituting contact points of a data entry form affixed to the touch panel. Consequently, there is a high risk that the entry form and/or the user's taps on the touch panel will not be correctly detected by some terminals.

Thus, there is a need to provide a solution allowing users to enter confidential data on terminals (payment terminals and communication terminals for example) comprising a touch screen, ensuring compatibility of this solution with all types of terminals.

This solution must be simple to implement and must also ensure the security of the entered data, while maintaining a relatively low cost when used on a touch screen.

Furthermore, this solution must also be ergonomic and offer an optimal handling for users, and in particular for visually impaired people.

SUMMARY OF THE INVENTION

The proposed technique allows solving at least some of the problems of the prior art. More particularly, the present technique relates to a data entry device intended to be affixed to a touch panel of a terminal, the touch panel being capacitive, the data entry device comprising:
  a substantially parallelepipedal plate comprising a lower face, which is substantially planar, for affixing the device to the touch panel, and an upper face comprising a matrix of entry areas forming a keyboard, the entry areas being configured to allow a detection of a user's finger by the touch panel when the device is affixed to the touch panel;
  at least two contact pads independent of each other, which are electrically conductive and arranged on the lower face.

According to the proposed technique, the contact pads are each electrically connected to additional means for evacuating, towards the outside of the touch panel, the electric charges concentrated at the contact pads when the data entry device is affixed and held on the touch panel.

Thus, the proposed technique allows an evacuation of the electric charges towards the outside of the screen in order to suppress interference on the touch panel of the terminal usually created by the contact pads of the data entry device. Thus, the detection problems of the entry device are suppressed. Such a device is therefore compatible with all the types of terminals.

According to a particular aspect, the evacuation means evacuate, towards the user's body, the electric charges concentrated at the contact pads when the data entry device is affixed and held, via the evacuation means, by the user on the touch panel of a terminal.

In this manner, the evacuation of the electric charges towards the outside of the screen is performed through the user's body. This solution proves to be relatively simple to implement and does not require any modification of the data entry device (including any addition of electronic components and/or software) in order to suppress interference on the touch panel of the terminal usually created by the contact pads of the data entry device. Thus, the detection problems of the entry device are suppressed. Such a solution further eliminates all the risks of non-compatibility of the data entry device with some types of terminals.

According to another particular aspect, said at least two contact pads are respectively electrically connected to said evacuation means by an electrical resistor.

According to another particular aspect, the means for evacuating the electric charges comprise at least one surface for holding, by a user's finger, the entry device on the touch panel, said at least one holding surface being electrically connected to each of said at least two contact pads, respectively via a conductive tab.

A conductive tab allowing electrically connecting the contact pads to the user's body is relatively simple to implement and is easy to use for the user. Indeed, the latter does not have to make any particular gesture since the electrical connection between the user's body and the contact pads arises from the tap of the user's finger on the conductive tab arranged on the holding surface.

According to another aspect, the means for evacuating the electric charges comprise a first surface and a second surface for holding the data entry device on the touch panel, the first and second holding surfaces being respectively in the form of a cavity shaped according to a left thumbprint and according to a right thumbprint.

This particular implementation improves ergonomics by facilitating the handling and the identification of the holding surface for the visually impaired user. It therefore also facilitates holding the entry device on the touch panel. In addition, these prints act as a foolproof device and allow correctly arranging (in the right direction) the entry device on the touch panel. The entry device is also ergonomic and compatible with a right-handed or left-handed user.

According to yet another aspect, the conductive tabs each extend through said first and second surfaces for holding the data entry device.

Thus, the contact pads are electrically connected to each of the prints via a tab. This technical solution is simple and inexpensive since it does not require implementing a tab connecting each contact pad with each print. Indeed, the same tab here allows connecting a contact pad to the two prints.

According to another aspect, the first holding surface is electrically connected to a first contact pad via a first conductive tab and to a second contact pad via a second conductive tab and the second holding surface is electrically connected to the first contact pad via the first conductive tab and to the second contact pad via the second conductive tab.

This particular arrangement of the conductive tabs, which electrically connect each holding surface to each of the contact pads, is optimal in terms of operation and manufacturing cost. Indeed, the implementation of a conductive tab connecting each contact pad to the two holding surfaces minimizes the risks of poor contact when the user holds the data entry device, in particular. In addition, this arrangement also avoids the implementation of four tabs each connecting a tab to a contact pad.

According to another aspect of the proposed technique, the means for evacuating the electric charges comprise a lever actuatable by a user and electrically connected with said at least two contact pads so as to evacuate the electric charges concentrated at the contact pads when the data entry device is affixed to the touch panel.

A lever allowing electrically connecting the contact pads to the user's body is relatively simple to implement and is easy to use for the user. Indeed, the latter does not have to make any particular gesture since the electrical connection between the user's body and the contact pads arises from the simple contact of the user with the lever which he uses to affix and hold the form on the touch panel, the lever being permanently electrically connected to the contact pads.

According to another aspect, the lever is movable between at least one raised position, in which the lever can be held by at least two fingers of the user forming a clamp, and a lowered position, in which the lever is in the unused position.

Thus, the data entry device can be easily held in place and used by the user, whether the touch panel extends horizontally or in an inclined manner, in particular. In addition, the lowered position of the lever, so when the data entry device is not in use, allows conveniently transporting the latter, as the lever is in the same plane as the data entry device.

According to another aspect, the lever has return means configured to return the lever from the raised position to the lowered position.

Thus, when the user has finished using the data entry device and therefore releases the lever, the latter is automatically lowered and the storage of the data entry device is facilitated. Furthermore, this return spring ensures an optimal pressing of the lower surface of the plate on the touch panel of the terminal when the lever is held by the user.

According to another particular aspect, the matrix of entry areas forming a keyboard comprises a first subset of ten numeric keys and a second subset of three function keys, the symbols of the function keys being shaped in negative relief on the upper face to the lower face.

Thus, the determination of the symbols by a user is facilitated, whether the user is visually impaired or not. In addition, such through keys allow an effective detection, by the terminal, of the tap by a user. Indeed, these keys in negative relief, for example recessed or through keys, allow a better detection than with projecting symbols in relief as projecting symbols move the user's finger away from the touch panel.

According to another aspect, the data entry device (1) comprises at least one beveled angle (115).

Thus, it is easy, for a visually impaired user in particular, to determine the orientation of the data entry device and to place it correctly on the touch panel of the terminal.

According to yet another aspect, the data entry device further comprises, on its lower face, means for reversibly adhering/securing the data entry device on the terminal.

According to a particular aspect, the reversible adhesion/securing means are in the form of at least one cushion manufactured from a flexible and adherent material.

The implementation of such a cushion allows ensuring an effective holding of the data entry device on the touch panel of the terminal so as to facilitate the use of the device by a user.

The proposed technique also relates to a method for entering data on a touch panel of a terminal, the method comprising:
- a step of laying, on a touch panel of the terminal, a data entry device as previously described;
- a step of establishing a capacitive connection between the contact pads and the touch panel of the terminal;
- a step of detecting, by the terminal, the position and the orientation of the data entry device based on a detection of said at least two contact pads;
- a step of entering, by a user, data on the surface of the data entry device;
- a step of detecting, by the terminal, data entered on the surface of the data entry device based on a detection of at least one tap of a user's finger on one of the entry areas forming a keyboard; and
- a step of confirming, by a user, the entered data.

According to the proposed technique, the method further comprises a step of evacuating, via evacuation means, the electric charges concentrated at the contact pads as long as the data entry device is affixed to the touch panel of the terminal.

According to a particular aspect, the step of evacuating the electric charges concentrated at the contact pads is carried out towards the user's body, via the evacuation means, as long as the data entry device is affixed and held, via the evacuation means, by the user on the touch panel of the terminal.

LIST OF FIGURES

The proposed technique, as well as its different advantages, will be more easily understood in light of the following description of two illustrative and non-limiting embodiments thereof, of their variants, and of the appended drawings among which:

DETAILED DESCRIPTION OF THE PROPOSED TECHNIQUE

General Principle

Figure 1:
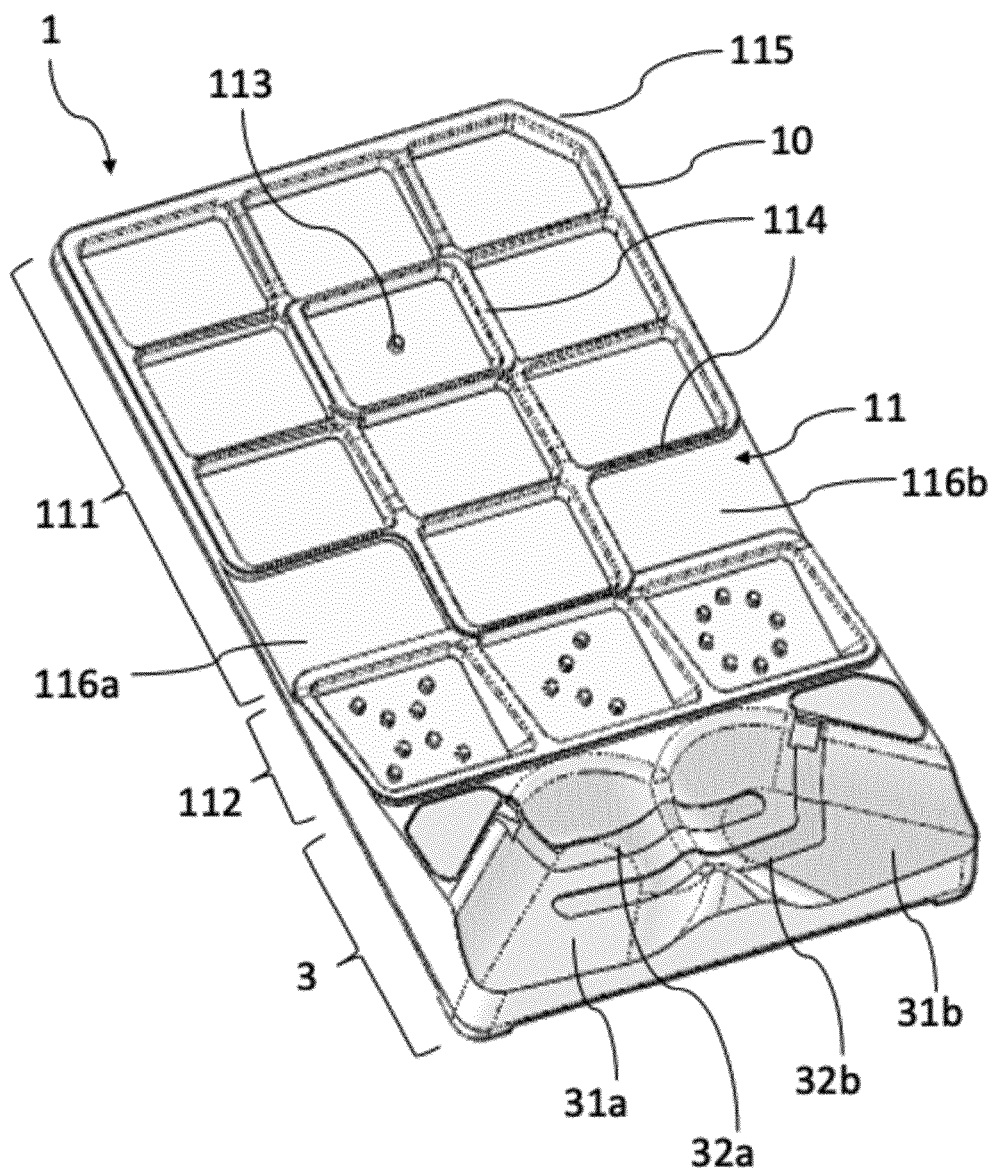
FIG. 1 illustrates a front perspective view of a data entry device to be affixed to the touch panel of a terminal according to a first embodiment of the proposed technique.

The general principle of the invention consists in proposing a physical data entry device intended to be affixed to a touch screen of a terminal. The device comprises a plate comprising an upper surface and a generally planar lower surface. The upper face comprises a matrix of entry areas forming a keyboard.

The plate, at the matrix of entry areas, is configured so that a user's contact/tap on this matrix is detected by the touch screen through the plate. When the device is affixed to the touch screen (either freely or on a specific area of this screen), the user (for example a visually impaired person) can directly touch the keys on the matrix of entry areas to enter characters on the touch screen.

In this general embodiment, it is not necessary to have additional electrical components to detect the keys on the entry areas of the data entry device, due to the structure of the matrix of entry areas.

The dimensions and the arrangement of the keys of the matrix of entry areas can be known beforehand by the users so that they can find their way around the matrix of entry areas. The matrix of entry areas can also comprise embossed or recessed patterns so that the users can find their way around, even without prior knowledge of the dimensions and the arrangements of the entry matrix. There are also profiles forming breadcrumbs, at some entry keys to allow the user to find his way around more easily.

In at least one embodiment, the lower face of the plate comprises two independent and electrically charged contact areas which allow the terminal to detect the presence and the position of the data entry device. The communication terminal can therefore recognize the position of the matrix of entry areas in view of the position of these electrically charged contact areas.

By independent contact areas, it should be understood contact areas which are not electrically connected to each other.

The communication terminal comprises an application or a specific module which allows identifying/detecting these electrically charged contact areas and therefore recognizing the position of the entry device relative to the screen.

In this manner, when the user enters information (for example a PIN code) using the entry device, the terminal is able to recognize the entered characters (regardless of the position and the orientation of the device) without even having to display the keyboard on the screen.

As previously described in relation to the prior art, depending on the different sensitivities of the touch panels and the implemented self-calibration software, the contact areas may not be detected or generate interference and are not recognized as constituting contact points of a data entry form affixed to the touch panel. Consequently, there is a high risk that the entry form and/or the user's taps on the touch panel are not correctly detected by some terminals.

More specifically, this risk is due to the fact that, for some types of terminals, the electric charges of the screen which are stored at the contact points are not evacuated towards the outside of the screen (which is performed via the user in a normal situation of contact on the touch panel, in particular). This is comparable/analogous to the situation in which a drop of water falls on a touch panel. Indeed, in the case of a drop of water, the electric charges concentrated at the drop of water are not evacuated and this creates interference in the detection of tap on the touch panel. The same applies to the contact points of the entry form for some types of terminals.

This interference can be filtered by software, but this is complex and costly to implement. Especially since each type of terminal must be modified/adapted to implement this type of filtering, which is not satisfactory.

In order to overcome this major drawback, the solution of the proposed technique provides, in at least one embodiment, that the two independent contact areas are separately electrically connected to additional means (in addition to the already present means) for evacuating, towards the outside of the touch panel of the terminal or ideally, towards the terminal ground, the electric charges concentrated at the contact pads when the data entry device is affixed and held on the touch panel.

It is considered here that the means for evacuating the electric charges are additional means since, in addition to the electric charges conventionally evacuated during the data entry by the user, via the entry matrix of the device in particular, the additional evacuation means allow evacuating the electric charges concentrated at the contact pads when the user holds the data entry device on the touch panel: they therefore intervene in addition to the already present means.

In this way, the electrically charged contact areas can be detected by all types of terminals. The electric charges concentrated at these areas when the data entry device is affixed to the screen being evacuated towards the outside of the touch panel, via the user for example, the contact areas no longer create interference and are effectively detected by the terminal.

The advantages provided by the entry device of the present technique are numerous. First, it allows visually impaired people to make data entries on touch screens on their own. It also allows making entries for people who do not have a particular disability, but who do not feel comfortable with touch screens. It also allows increasing the security level of data entry (in particular confidential data) on the touch screens without requiring the display of a virtual keyboard: it thus allows preventing ill-intentioned people from locating the data entries. Finally, it also allows an optimal detection of the data entry device, and this regardless of the sensitivity and the self-calibration software of the touch panel.

Two embodiments of the proposed technique as well as variants thereof, treated as simple illustrative and non-limiting examples, are illustrated below in support of FIGS. 1 to 23.

Description of a First Embodiment

A first embodiment, as well as a variant, of the data entry device according to the present technique are described in relation to FIGS. 1 to 7.

As illustrated in FIG. 1 in particular, the data entry device 1 comprises a substantially parallelepipedal plate 10, intended to be affixed to a touch panel 21 of a communication terminal 2 (illustrated in FIGS. 19 to 22).

The plate 10 is generally rectangular and is made of an electrically insulating material so as not to emit a parasitic capacitance that is difficult to control. Preferably, the plate 10 is made of a non-conductive, rigid and transparent material. For example, the plate 10 is made of a plastic material, such as polycarbonate, or glass.

Figure 2:
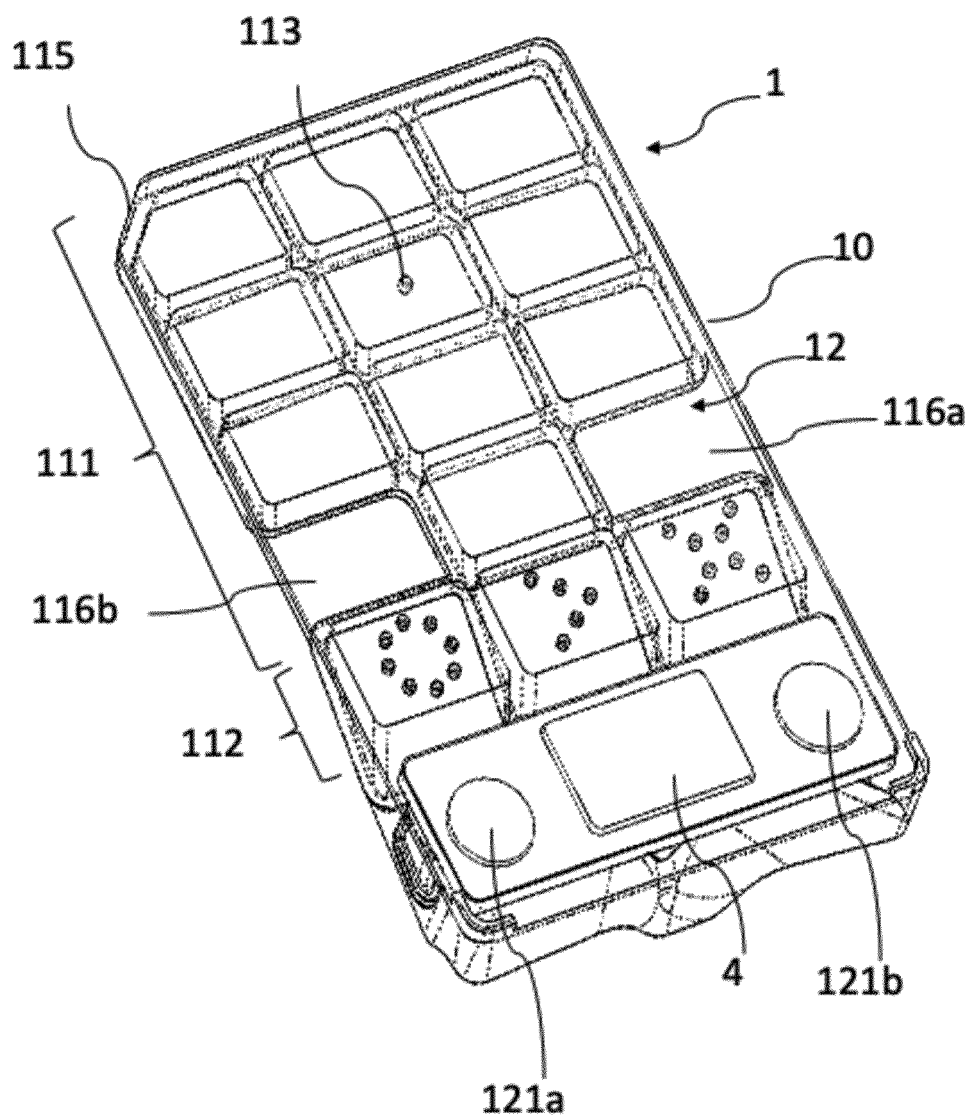
FIG. 2 illustrates a bottom perspective view of the data entry device of FIG. 1.

The plate 10 comprises an upper face 11 (illustrated in FIG. 1) and a lower face 12 (illustrated in FIG. 2). The upper surface 11 comprises a matrix of entry areas forming a keyboard and provided in portrait format. The matrix of entry areas comprises a set of rectangular entry keys grouped into a first subset 111 and a second subset 112. The set of entry keys is representative of a keyboard for entering a confidential code on a payment terminal, for example.

The first subset 111 comprises ten numeric keys representing the numbers 1, 2, 3, 4, 5, 6, 7, 8, 9, and 0. The numeric keys are generally planar and have no specific indication as to which numbers the numeric keys represent. This prevents an ill-intentioned person from watching the keys that are used for the entry.

As illustrated, the number five key comprises, in its center, a locating pin 113. The keys of numbers 1 to 4 and 6 to 9 are positioned around the number 5 key, as usual. Locating the number 5 key allows the visually impaired user to mentally and quickly visualize the positions of the other numeric keys.

The second subset 112 comprises three functional keys: a cancel key 112-1, a clear (correction) key 112-2 and a confirm key 112-3. The functional keys comprise embossed or recessed patterns indicating the functions of the keys (as described in more detail below). For example, the pattern "X" represents the cancel function, the pattern "<" represents the clear function, and the pattern "O" represents the confirm function.

The entry areas of the first 111 and second 112 subsets of keys have a thickness configured to allow a detection of a finger by the touch panel 21 when the device 1 is affixed to the touch panel (as described in more detail below in relation to FIGS. 12 to 15). For example, the bottom of the keys has a thickness comprised between 0.1 and 0.3 mm when the plate 10 is made of polycarbonate.

In the case of a plate 10 made of a material having a higher permittivity, for example glass, the thickness of the plate can be increased up to 0.4 mm, for example.

More specifically, in the plane of the upper face 11 of the plate 10, the ten numeric keys of the first subset 111 are arranged in four rows and three columns. They are also arranged above the three functional keys 112-1 to 112-3 of the second subset 112 of keys, which are themselves arranged in a row.

The lower left 116a and right 116b angles (located on the fourth row therefore) of the first subset 111 of keys (located on the fourth row therefore) have no key. These angles 116a, 116b are located on either side of the 0 key and serve as a marker for a visually impaired user.

The keys of the matrix of entry areas are separated from each other by a form of profiles 114, of predetermined heights and shapes. The shapes of the profiles 114 of the form of profiles are adapted so as to form a plurality of positioning markers of the keyboard keys.

More particularly, the profiles 114 form one or more breadcrumbs, which allow a visually impaired user to locate the location of the keys. For example, the profiles 114 form a first peripheral breadcrumb, over the entire perimeter of the entry device 1, allowing delimiting the external volume of the entry device 1. The profiles 114 can also form a second and a third breadcrumb respectively delimiting the first 111 and second 112 subsets of entry keys. Finally, the profiles 114 can also form a breadcrumb around the 5 key.

Thus, a visually impaired person is able to easily and accurately locate the location of the keyboard keys on the device 1 by brushing or touching the profiles 114: the equivalent of several breadcrumbs is thus defined, which when followed by the visually impaired person, using one or several fingers, allow following the form of keys and identifying the place where a particular key is located in a simple and intuitive manner.

In addition, in a particular implementation, a corner 115 of the data entry device 1 (for example at the top right) is beveled and allows the user to orient the data entry device 1 without possible confusion. This beveled corner 115 serves, by convention, to orient the data entry device 1 and is therefore recognizable by any visually impaired person.

As illustrated in FIG. 2, the lower face 12 of the data entry device 1 comprises, in this example, two substantially planar and electrically conductive contact areas or pads 121a, 121b.

The contact pads 121a, 121b are independent, that is to say electrically insulated from each other. In other words, and given that the plate 10 is made of a non-conductive material, the contact pads 121a, 121b are not electrically connected to each other as long as the user does not hold the data entry device 1 by the additional evacuation means 3, as described below. In this manner, a transfer of electric charges from one contact pad to the other is prevented so as to avoid a random detection of the data entry device 1 by the terminal 2.

In this example, the two contact pads 121a and 121b are very flexible and planar, so as to maximize their surface in contact with the touch panel 21. Here they have the shape of a disc the diameter of which is comprised between 8 and 10 mm, so that the contact pads 121a, 121b have a surface substantially identical to that of a finger of a user when the data entry device is affixed to the touch panel 21 of the terminal 2.

The two contact pads 121a and 121b are for example made of conductive silicone, that is to say a silicone charged with carbon particles, the hardness of which is comprised between 40 and 80 Shores A. Other techniques or materials can be used to make the contact pads, such as for example: pads made of metal or any other conductive material, designs/patterns made with conductive inks (directly on the lower face of the plate, or on a film which is itself then transferred to the lower face of the plate), etc.

The center distance between the contact pads 121a, 121b is determined and known to the controller of the terminal 2, which can thus, after detecting the two contact pads, detect that the data entry device 1 has been affixed to the touch panel 21. The controller can also deduce therefrom the position and the orientation modulo 180° of the data entry device 1 on the touch panel 21.

In this manner, the data entry device 1 comprises, inherently, a signature. This signature consists of the two points of contact with the touch panel 21 of the terminal. When the data entry device 1 is laid on a touch surface, and more particularly a capacitive touch surface, the layer of the touch surface which accumulates the electric charges transmits some of these electric charges to the two contact pads 121a, 121b.

The terminal 2 is then able to detect that the independent contact pads 121a, 121b correspond to a particular geometry representative of the data entry device 1.

The terminal 2 can therefore recognize the position of the matrix of entry areas relative to the position of the electrically charged contact area, and also the dimensions and the arrangements of the matrix of entry areas (when it is envisaged to have several types of different matrices, both in size and functionality or in number of keys). The terminal 2 can then activate a data entry mode corresponding to the entry via the data entry device 1.

More particularly, according to the proposed technique, the lower face 12 of the plate 10 comprises for example two electrically charged contact areas: a first contact pad 121a is positioned in the lower left corner of the lower face 12 of the plate 10 and a second contact pad 121b is positioned in the lower right corner of the lower face 12 of the plate 10.

Preferably, the contact pads 121a, 121b are located about 9 mm from the lower edge and the side edges of the lower face 12 of the plate 10. This distance between the edges of the plate 10 and the contact pads 121a, 121b allows preventing the terminal 2 from losing the detection/position of the data entry device 1 on the touch panel 21, in the case of parasitic/involuntary contact of the finger of a user near the edge of the plate 10.

Indeed, if the user involuntarily touches the touch panel 21 near the edge of the plate 10 and the contact pads 121a, 121b are arranged too close to the edges, there is a risk that the terminal 2 considers the finger and the contact pad a single shape. In other words, there is a risk that the terminal 2 merges these two contact points on the touch panel 21, which would lead to a loss of the detection of the data entry device 1.

As already indicated, and in a known manner, the communication terminal 2 comprises an application or a specific module which allows identifying these contact pads 121a, 121b and therefore recognizing the position and the orientation modulo 180° of the data entry device 1 relative to the screen.

According to the proposed technique, the data entry device 1 comprises additional means 3 for evacuating the electric charges towards the outside of the touch panel 21 when the data entry device 1 is affixed to the latter.

As illustrated in FIG. 1, the additional evacuation means 3 are integrated into the plate 10 and are located on the upper face 11 of the plate 10, below the second subset 112 of keyboard keys.

In this embodiment, the additional evacuation means 3 comprise a first and a second holding surfaces in the form of a left thumbprint 31a and a right thumbprint 31b respectively. In this manner, the data entry device 1 is compatible with a right-handed or left-handed user. The prints 31a, 31b are integrated into the plate 10, that is to say they are made of the same (non-conductive) material as the plate 10.

The thumbprints 31a, 31b are symmetrical. In addition, they are slightly oriented towards the middle/center of the plate 10 and inclined in the direction of the touch panel 21 so as to constrain the user's tap and promote an optimal holding of the data entry device 1 on the touch panel 21.

In this example, the prints 31a, 31b are each arranged at an angle of ±45° with respect to the longitudinal axis of the plate 10. The prints are also inclined at approximately 6° towards the inside of the plate 10.

A visually impaired user wishing to enter a code via the data entry device 1 can therefore hold the latter by laying one of his thumbs on a corresponding holding surface. In particular, when the terminal is in the form of a smartphone, the user can grasp his smartphone while pinching the data entry device 1 against the screen of the smartphone with his thumb.

The handling and the identification of the holding surface 31a, 31b for the visually impaired user are thus facilitated. These holding surfaces 31a, 31b also facilitate holding the entry device 1 on the touch panel. In addition, these different prints 31a, 31b act as a foolproof device and allow correctly arranging (that is to say in the right direction with the lower face 12 towards the touch panel) the entry device 1 on the touch panel 21.

The implementation of such prints 31a, 31b to hold the data entry device 1 is particularly suitable when the data entry device 1 is used on a nomadic/mobile terminal, such as a smartphone or a touch tablet, for example.

Furthermore, the additional evacuation means 3 comprise conductive tabs or blades 32 which electrically connect each of the contact pads 121a, 121b to the holding surfaces 31a, 31b.

The conductive tabs 32 are made of a conductive, preferably stainless material, in order to ensure an optimal reliability. For example, conductive tabs 32 are made of copper, bronze, stainless steel, etc.

In this example, the conductive tabs 32 are made in the form of tracks directly traced in the prints 31a, 31b of the plate 10. The conductive tabs 32a, 32b are each electrically connected to a contact pad 121a, 121b via a resistor 5 (not illustrated in this embodiment).

This electrical resistor 5 allows the circuit to approximate the human body model, which is the model most commonly used to characterize the sensitivity of an electronic device to damage caused by electrostatic discharges. Thus, the electrical resistor 5 connecting a conductive tab 32 with a contact pad 21 has a value less than or equal to 1.5 kΩ, and preferably a value of 1.5 kΩ.

In this embodiment, it is the user who allows connecting the data entry device 1 to ground to discharge the electric charges concentrated at the contact pads 121a, 121b from the touch panel 21. Thus, the electric charges of the touch panel 21 concentrated at the contact pads 121a, 121b are transported to ground through the electrical resistors 5, the conductive tabs 32a and 32b and the user's body.

The evacuation of the electric charges only occurs when the user holds the data entry device 1 via the additional evacuation means 3, and only as long as the data entry device 1 is held. In this example, the evacuation of the charges begins when a user's finger comes into contact with the conductive tabs 32a, 32b and continues as long as the user's finger remains in contact with the latter.

It is obviously understood that the evacuation of the electric charges via the additional evacuation means 3 is performed in addition to the electric charges conventionally evacuated at the user's finger used to make a data entry via the data entry device of the invention.

These additional evacuation means 3 thus allow an effective detection of the two contact points of the entry device 1 when it is laid and held on the touch panel 21, regardless of the sensitivity of the touch panel and regardless of the program installed on the terminal. Thus, the present technique offers a solution compatible with all the types of terminals.

In this example, each contact pad 121a, 121b is electrically connected to the two holding surfaces 31a and 31b via a conductive tab 32a, 32b. Similarly, each holding surface 31a, 31b is connected to the two contact pads 121a, 121b respectively via a conductive tab 32.

As illustrated in FIG. 1 in particular, a first conductive tab 32a electrically connects the first contact pad 121b to the two holding surfaces 31a, 31b. Similarly, a second conductive tab 32b electrically connects the second contact pad 121a to the two holding surfaces 31a, 31b. The conductive tabs 32a, 32b therefore each extend from one contact pad 121a, 121b and through the two holding surfaces 31a, 31b.

Preferably, the conductive tabs 32a, 32b extend in a flush manner and through each of the holding surfaces 31a, 31b so that the thumb of a user laid on one of the holding surfaces 31a, 31b is simultaneously in electrical contact with the two conductive tabs 32a, 32b. Thus, the user's thumb is in electrical contact with the two contact pads 121a, 121b in order to evacuate the electric charges concentrated at the two contact pads 121a, 121b from the touch panel 21.

It should be noted that the conductive tabs 32a, 32b are not electrically connected to each other and are independent. As illustrated, the conductive tabs 32a, 32b are spaced apart from each other in order to limit the parasitic capacitances. For example, the conductive tabs 32a, 32b are at a spacing of at least 2 mm from one another.

In addition, the conductive tabs 32a, 32b must be sufficiently distant from the touch panel 21, also in order to avoid the parasitic capacitances. For example, the conductive tabs 32a, 32b are spaced by at least 2 mm from the touch panel 21 when the data entry device 1 is affixed to the terminal 2.

The distance between the conductive tabs 32a, 32b and the distance between the touch panel 21 and the conductive tabs 32a, 32b can be modified according to the width of the conductive tabs 32a, 32b. For example, if the width of the conductive tabs 32a, 32b is decreased, the distance between the conductive tabs 32a, 32b and the touch panel 21 can be reduced. In this example, the conductive tabs 32a, 32b have a width of approximately 2 mm.

Similarly, the contact pads 121a, 121b are not electrically connected to each other (neither by a resistor, nor by a capacitor, nor by any other electrical component) and are independent. Indeed, no electrical connection must be made between the contact pads 121a, 121b in order to ensure a homogenous operation of the data entry device 1 on all types of terminals.

Figure 3:
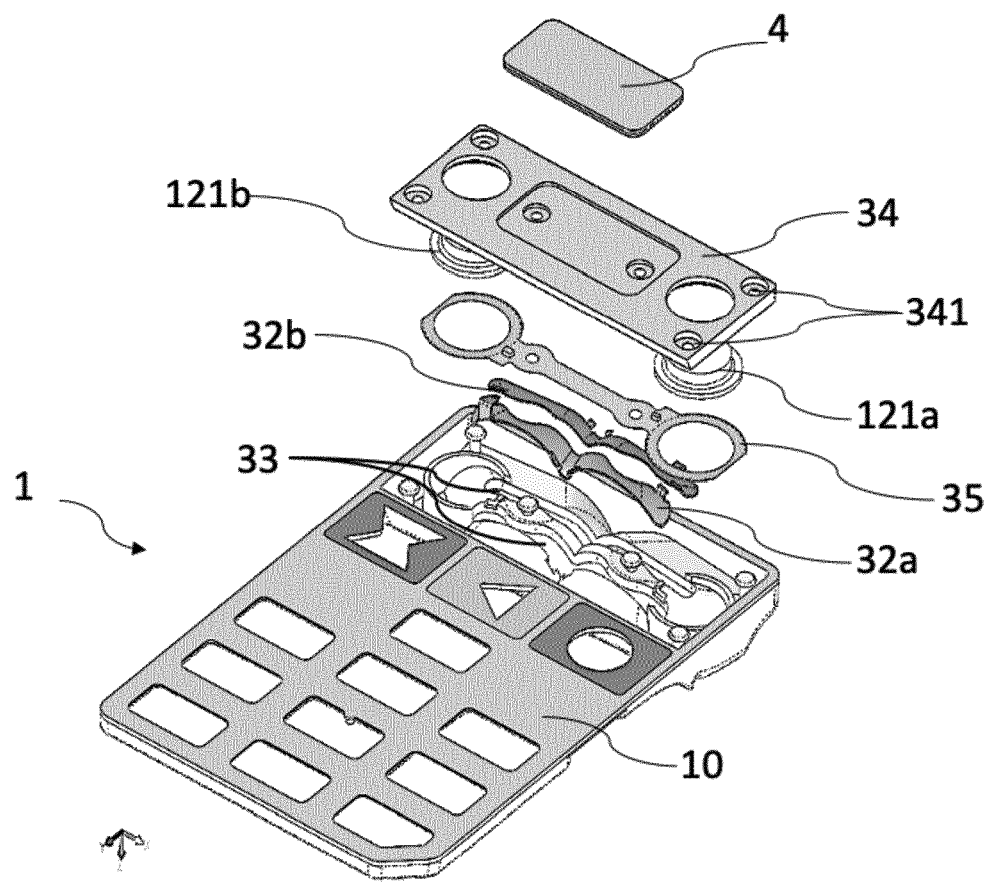
FIG. 3 illustrates an exploded view of a variant of the data entry device of FIG. 1.

FIG. 3 illustrates an exploded view of a variant of the data entry device 1 showing in detail and from below the elements constituting the additional means 3 for evacuating the electric charges.

In this variant, the conductive tabs 32a, 32b are not traced on the prints 31a, 31b. The conductive tabs 32a, 32b are here independent elements inserted in the prints 31a, 31b and implemented in direct contact with the contact pads 121a, 121b.

As illustrated, the plate 10 comprises, at the prints 31a, 31b, openings 33 for receiving the conductive tabs 32a, 32b. As previously indicated, these openings 33 are configured so that the conductive tabs 32a, 32b are flush with the surface of the prints 31a, 31b coming into contact with the user.

An intermediate connecting element 35, which is in this example in the form of a flexible printed circuit, FPC, is located between the conductive tabs 32a, 32b and the contact pads 121a, 121b in order to establish the electrical contact between the conductive tabs 32a and 32b and the contact pads 121a, 121b.

Preferably, the intermediate connecting element 35 is transparent, just like the plate 10, so that the entire product is transparent in order to be able to easily visually check that there are no spy/fraudulent electronics inside the data entry device 1.

In this example, electrical resistors (not shown) are welded to the intermediate connecting element 35 in order to be able to adjust the resistance of the assembly.

The value of these resistances depends on the materials chosen to manufacture the contact pads 121a, 121b and the conductive tabs 32a, 32b. The value of these resistances is between 0 and 1.5 kΩ.

A cover 34, or support base, made of a non-conductive material is provided in order to cover and hold the conductive tabs 32a, 32b, the connecting element 35 and the contact pads 121a, 121b. Openings 341 for the passage of the contact pads 121a, 121b are provided through the cover 34 so as to allow the contact of the contact pads 121a, 121b with the touch panel when the data entry device 1 is affixed to the touch panel 21 of the terminal 2.

The cover 34 is fastened by non-conductive securing means on the plate 10. In this example, a hot heading is implemented to secure the cover 34 with posts 101 of the plate 10 at six attachment points 341. Other securing means could be envisaged, such as for example clips, gluing or ultrasonic welding.

Figure 16:
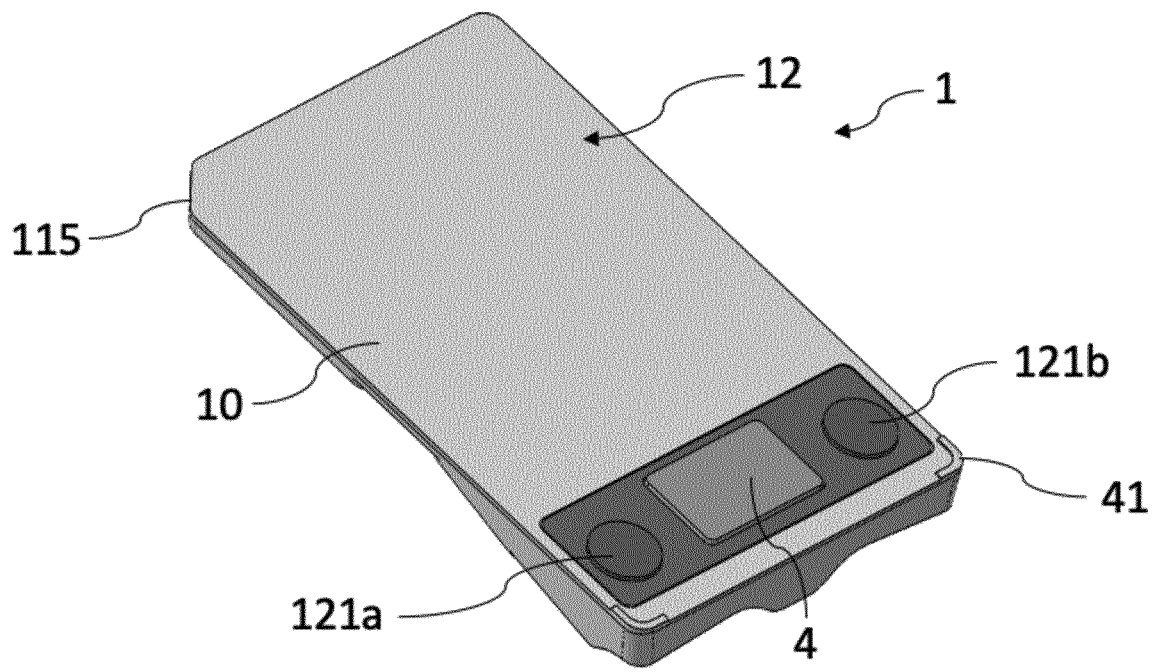
FIG. 16 illustrates a first variant of the adherence means of the data entry device according to the first or the second embodiment.
Figure 17:
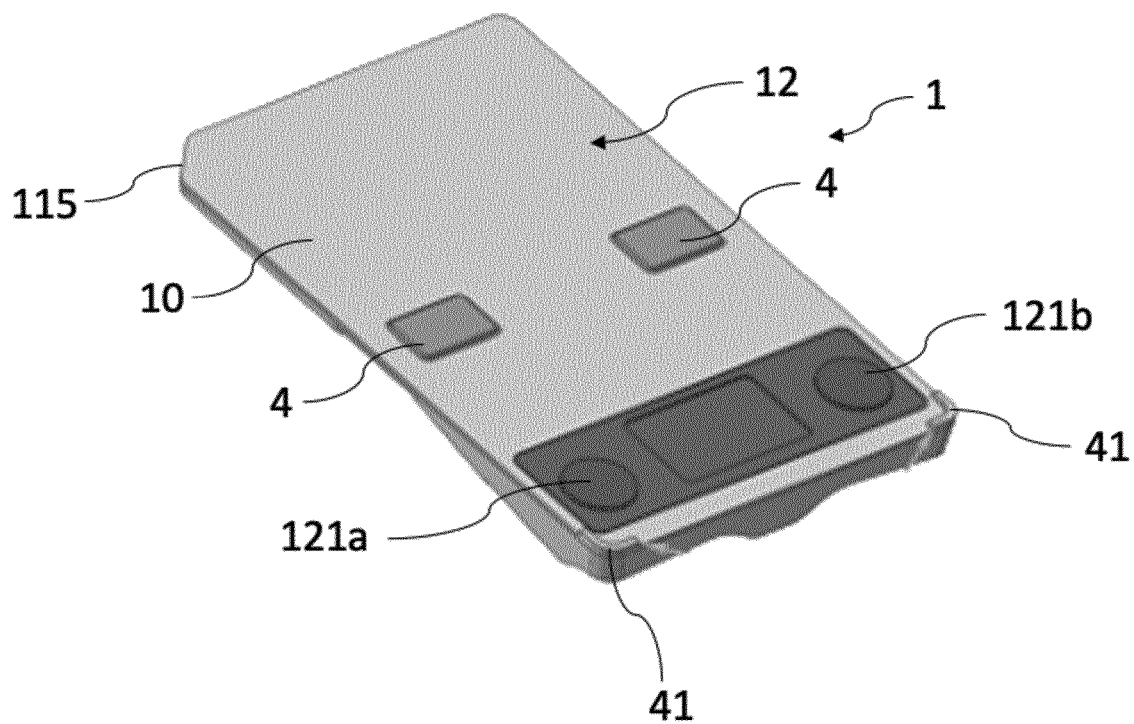
FIG. 17 illustrates a second variant of the adherence means of the data entry device according to the first or the second embodiment.
Figure 18:
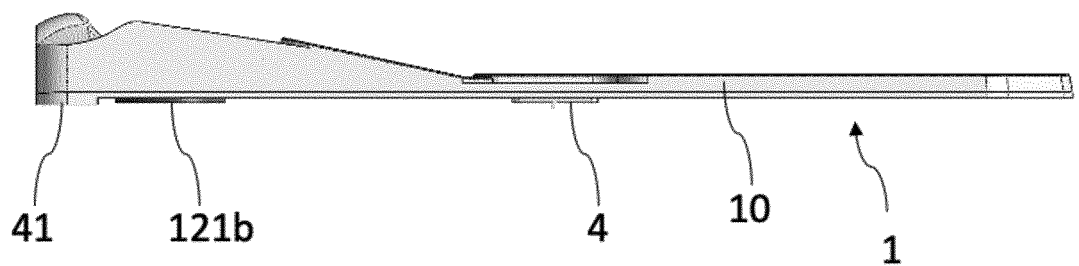
FIG. 18 is a side view showing the adherence means of the data entry device of FIG. 17.

A cushion 4 is secured to the lower face of the cover, that is to say located on the lower surface 12 of the plate 10. This cushion 4, described in more detail in relation to FIGS. 16 to 18, is manufactured from a flexible and adherent material and allows holding the data entry device 1 in position when the latter is affixed to the touch panel 21 of the terminal 2.

Figure 4:
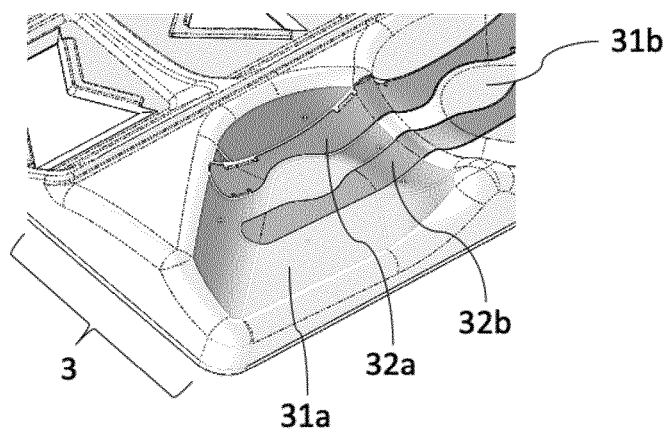
FIG. 4 is a detail view illustrating in perspective a surface for holding the data entry device of FIG. 3.

FIG. 4 illustrates in detail the first holding print 31a of the additional evacuation means 3. As illustrated, the two conductive tabs 32a, 32b extend flush within the first print 31a and, in the same way, within the second print 32a.

Figure 5:
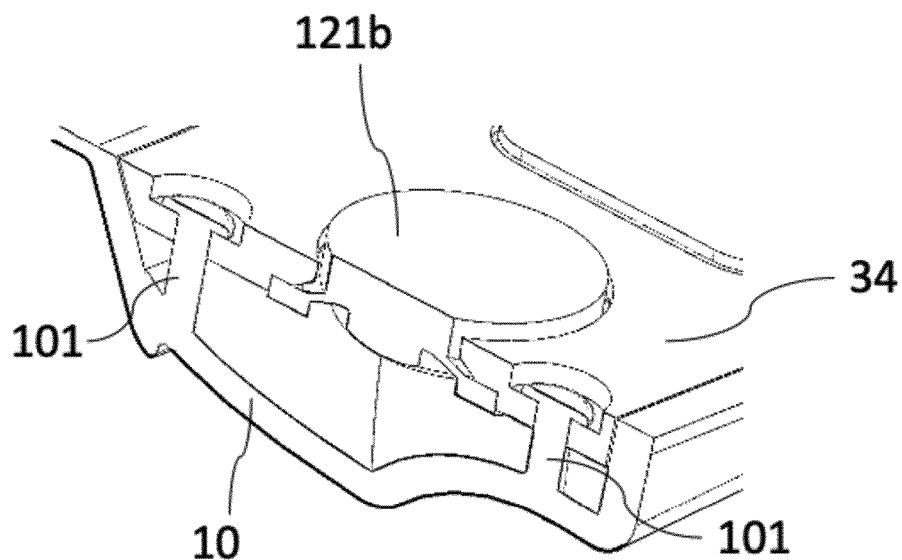
FIG. 5 illustrates a sectional view of a contact pad of the data entry device of FIG. 3.

FIG. 5 illustrates a sectional view showing the securing of a contact pad 121b with the plate 10 of the data entry device 1. In order to avoid the appearance of parasitic capacitances, the assembly of the contact pads 121a, 121b with the plate is carried out without a metallic element.

In the shown example, the contact pad 121b is clipped/snapped onto the support cover 34. Other assembly techniques may be implemented, such as the heat sealing or the hot heading, for example. Preferably, the assemblies of the contact pad 121b on the support cover 34 and of the support cover 34 on the plate 10 are not removable.

Figure 6:
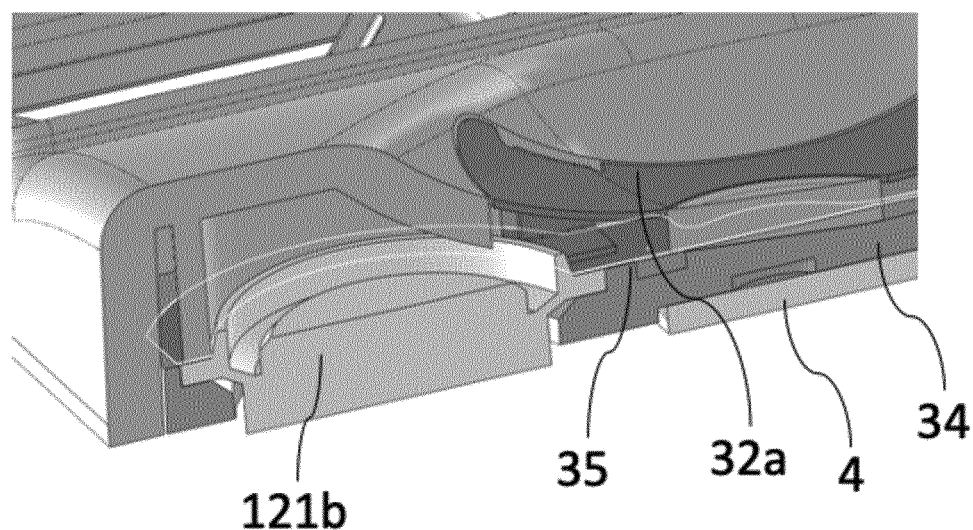
FIG. 6 illustrates a sectional view of a contact pad and a surface for holding the data entry device of FIG. 3.

FIG. 6 illustrates a sectional view showing the assembly of the additional evacuation means 3 with the plate 10. As indicated above, the contact pad 121b is clipped/snapped onto the support cover 34. The conductive tab 32a is received in an opening 33 of the plate 10 and is held within this opening by the intermediate connecting element 35.

Figure 7:
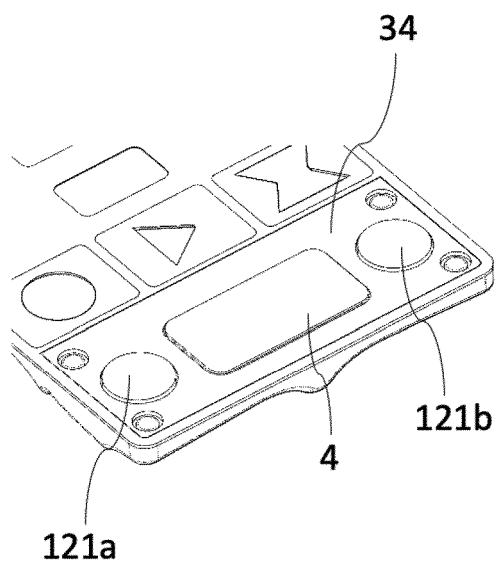
FIG. 7 is a detail view partially illustrating the lower face of the data entry device of FIG. 3.

FIG. 7 is a bottom view partially showing the data entry device 1. More precisely, this figure shows the lower face 12 of the plate 10, at the additional evacuation means 3.

The support cover 34 has, in this example, a cushion 4 located between the two contact pads 121a, 121b. This cushion 4, manufactured from a flexible material and having a high coefficient of friction, allows preventing the data entry device 1 from moving during its use, that is to say when it is affixed and held on the touch panel 21 of the terminal 2.

In this example, the cushion 4 is rectangular in shape and largely occupies the space left free between the two contact pads 121a, 121b.

Although the contact pads 121a, 121b and the cushion 4 are aligned, the contact pads 121a, 121b, which are manufactured from a relatively flexible material, fade in order to avoid a hyperstatic situation. It should be noted that the contact pads 121a, 121b as well as the cushion 4 must be in contact with the touch panel 21 of the terminal 2 in order to ensure an optimal operation of the data entry device 1.

Other shapes and dimensions of cushion 4 may be envisaged. In the same way, several cushions 4 may be implemented and be located differently on the lower surface 12 of the plate 10, as detailed with reference to FIGS. 16 and 17 in particular.

Description of a Second Embodiment

A second embodiment of the data entry device 1 according to the present technique is described in relation to FIGS. 8 to 11.

In this second embodiment, the data entry device 1 is substantially identical, in its structure and its operation. These are the additional means 3 for evacuating and holding the data entry device 1 which differ.

The elements identical to the first embodiment have the same reference numerals in the figures. The technical characteristics of these elements being identical to the first embodiment, these elements are therefore not described again.

Figure 8:
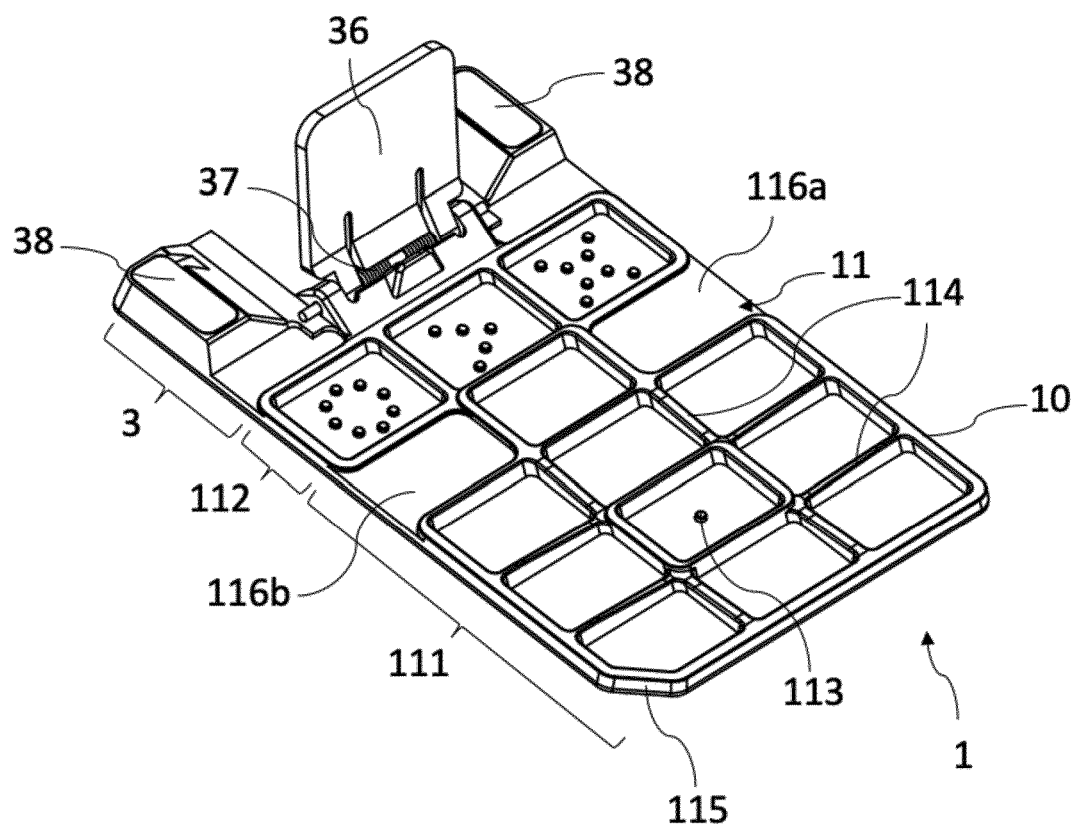
FIG. 8 illustrates a front three-quarter perspective view of a data entry device to be affixed to the touch panel of a terminal according to a second embodiment of the proposed technique, this figure showing the evacuation means in a first position.

As illustrated in FIG. 8, the additional evacuation means 3 comprise a lever 36, secured to the plate 10, which serves as a gripping means for the user and which is electrically connected to the independent contact pads 121a, 121b. More precisely, the two faces of the lever 36 are permanently electrically connected with the contact pads 121a, 121b, via a 1.5 kΩ resistor.

This lever 36 is pivotally mounted/movable in rotation relative to the plate 10 so as to allow an easy use of the data entry device 1 both on a terminal 2 arranged horizontally (that is to say flat, like for example an electronic payment terminal laid on a table or a counter) or arranged in an inclined or even vertical manner (that is to say upright, such as for example a cash dispenser or an autonomous payment terminal).

In FIG. 8, the lever 36 is shown in the raised position, also called the use position. This raised position of the lever 36 allows facilitating the use of the data entry device 1 when it is affixed to a terminal 2 arranged in an inclined or vertical manner. In the raised position, the user may hold the data entry device 1 by grasping/pinching the lever 36 with two fingers (for example his thumbprint and his index finger).

Figure 9:
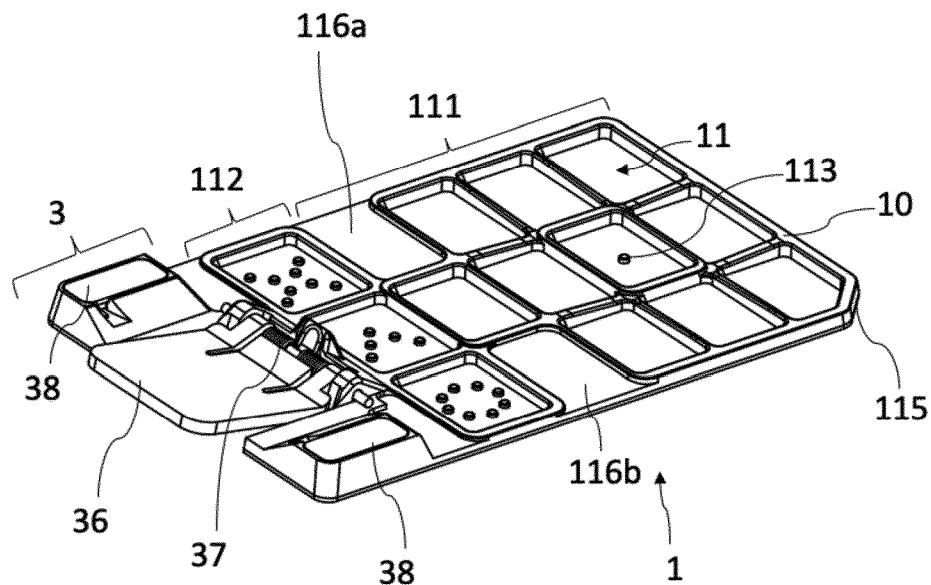
FIG. 9 illustrates a rear three-quarter perspective view of the data entry device of FIG. 8 showing the evacuation means in a second position.

In FIG. 9, the lever 36 is shown in the lowered position, also called the unused position or the storage position. This lowered position of the lever 36 allows facilitating the storage of the data entry device 1 when the latter is not in use, for example in a pocket or in a user's bag.

The lever 36 may also be used according to other inclination positions, called intermediate positions, in which the lever 36 is inclined at an angle allowing the lever 36 to extend between the two extreme positions, that is to say between the raised and lowered positions shown in FIGS. 8 and 9.

A return spring 37 is secured to the lever 36 and acts to return the lever 36 to the lowered position. Thus, the return spring 37 allows, when the user holds the lever 36 to use the data entry device 1 on a terminal 2, pressing the plate 10 against the touch panel 21. The gripping of the lever 36 between the two user's fingers and the holding of the data entry device 1 are thus facilitated.

When the user wishes to use the data entry device 1 on a terminal 2 arranged substantially horizontally, he may, in the same way, use his thumbprint and his index finger to grasp the lever 36 and thus hold the data entry device 1 in position. The return force of the return spring 37 allows, when the user grasps the lever 36, optimally pressing the lower face 12 of the plate 10 of the data entry device 1 on the touch panel 21 of a terminal 1. More specifically, an optimal pressing of the data entry device 1 ensures an effective positioning and contact of the contact pads 121a, 121b and of the cushion(s) 4 against the touch panel 21.

The position/inclination of the lever 36 substantially depends on the use that is made of the data entry device 1, in particular if the terminal 2 is arranged at hand height, at face height, horizontally or vertically, etc.

The implementation of such a lever 36 is particularly suitable when the data entry device 1 is used on relatively stable touch panels, or when the terminal 2 is arranged on a table or mounted on a fixed support.

In this example, each face of lever 36 is electrically and distinctly connected to each contact pad 121a, 121b. Thus, regardless of the position in which the lever 36 is used (that is to say raised or inclined according to one of the intermediate positions in particular), the user will necessarily be in contact with the two faces of the lever 36 electrically connected to the contact pads 121a, 121b so as to evacuate the electric charges of the touch panel 21 concentrated at the contact pads 121a, 121b.

These additional evacuation means 3 according to this second embodiment therefore also allow a detection of the two contact points of the entry device 1 when it is laid on the touch panel 21, whatever the sensitivity of the touch panel and whatever the program installed on the terminal. Thus, the present technique offers a solution compatible with all types of terminals, also according to this second embodiment.

The lever 36 has a sufficiently large thickness to avoid the risk of parasitic capacitance between the two faces of the lever 36.

Figure 10:
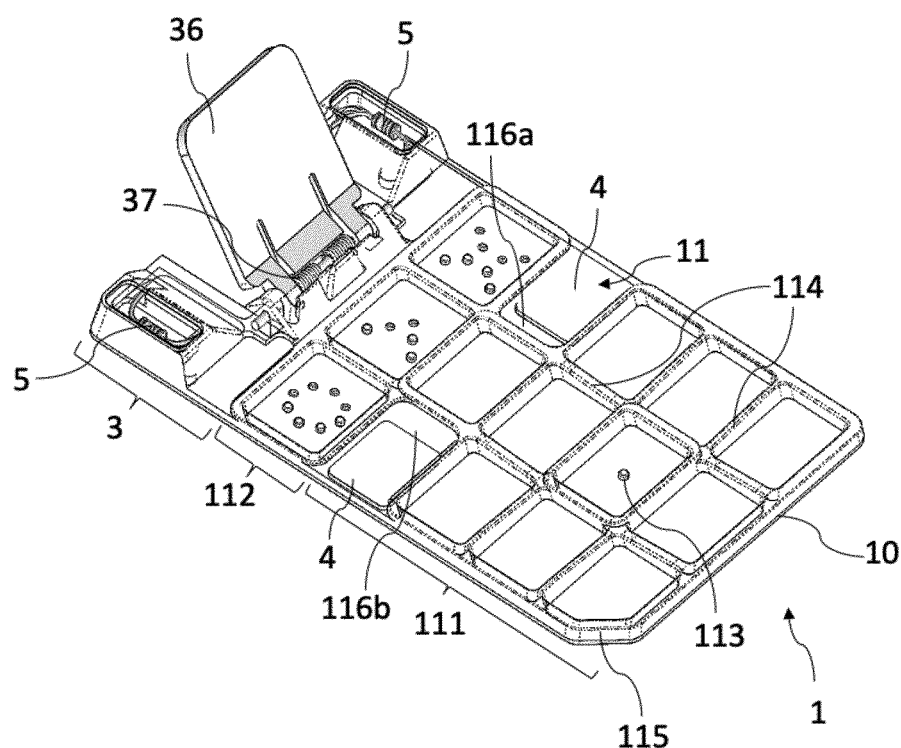
FIG. 10 illustrates another perspective view of the data entry device of FIG. 8.

FIG. 10 illustrates the data entry device 1 of FIG. 8 showing in transparency a part of the additional evacuation means 3. More particularly, this figure illustrates the implementation of the electrical resistors 5 connecting each face of the lever 36 to the contact pads 121a, 121b.

Thus, the pad 121a is connected, via a first electrical resistor 5, to one of the surfaces of the lever 36. In the same way, the pad 121b is connected, via a second electrical resistor 5, to the other face of the lever 36.

Whatever the position of the lever 36, the contact pads 121a, 121b always remain in electrical contact with the lever 36 so as to ensure the use of the data entry device 1 by evacuating towards the outside of the touch panel the loads concentrated at these pads.

In this example, protrusions 38 are located on either side of the lever 36 and each receive an electrical resistor 5. These protrusions 38 also allow the user to spatially find his way around and to correctly apply the data entry device 1 on the touch panel 21 of the terminal 2.

In a variant not shown, it is possible to provide resistors 5 of smaller dimensions so as to avoid the implementation of the protrusions 38 on the plate 10 on either side of the lever 26.

FIG. 10 also illustrates, in transparency, the position of the cushions 4 as described below.

Figure 11:
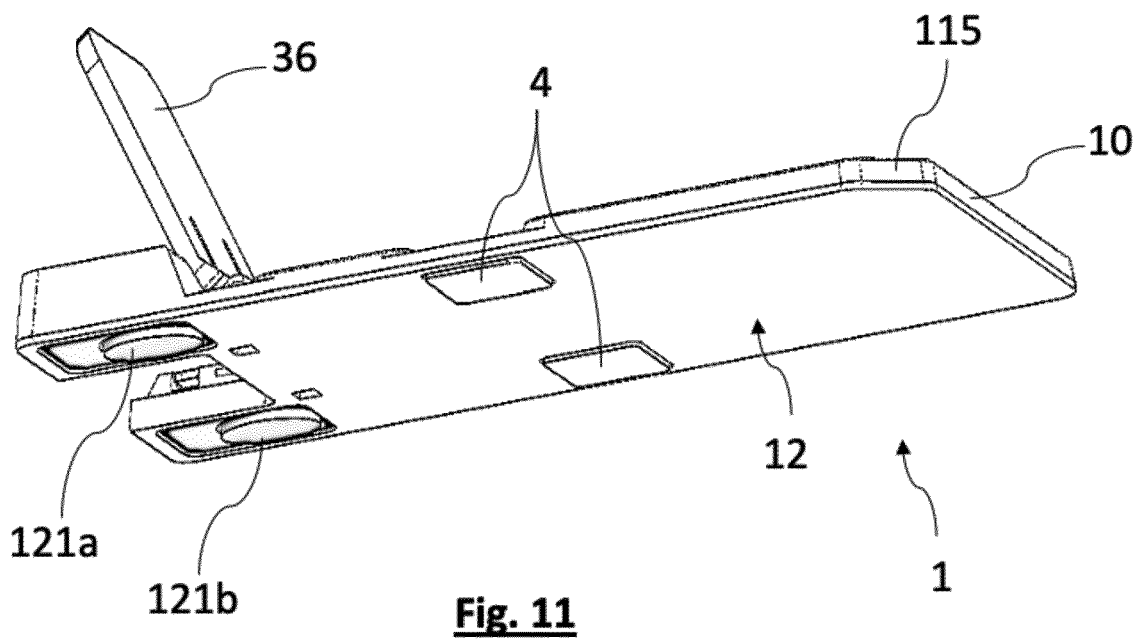
FIG. 11 illustrates a bottom perspective view of the data entry device of FIG. 8.

FIG. 11 shows the implementation of the contact pads 121a, 121b and the cushions 4. As illustrated, the contact pads 121a, 121b are arranged substantially similarly to the first embodiment, that is to say close to each lower corners of the lower surface 12 of the plate 10. For reasons identical to the previous embodiment, the contact pads 121a, 121b are separated, for example by a distance of 9 mm, from the edges of the plate 10.

In this example, there is no more cover 34 since it is the lever 36 which is located in this place. Thus, the single cushion 4, which was located between the two contact pads 121a, 121b in the first embodiment, is substituted by two cushions 4, of smaller dimensions, located substantially in the middle of the length of the plate 10 and at the lateral edges of the plate 10.

More specifically, the cushions 4 are substantially located opposite the lower left 116a and right 116b corners of the first subset 111 of keys, as illustrated in transparency in FIG. 10. This particular position of the two cushions 4 on the lower face 12 of the plate allows ensuring an optimum adherence of the data entry device, and this, whatever the mode of gripping of the user (that is to say with the lever 36 in the raised or inclined position in particular). Indeed, under the effect of the return spring 37, the data entry device 1 is pressed against the touch panel 21 of the terminal 2, which ensures an optimum adherence of the cushions 4.

Data Entry Method

Figure 23:
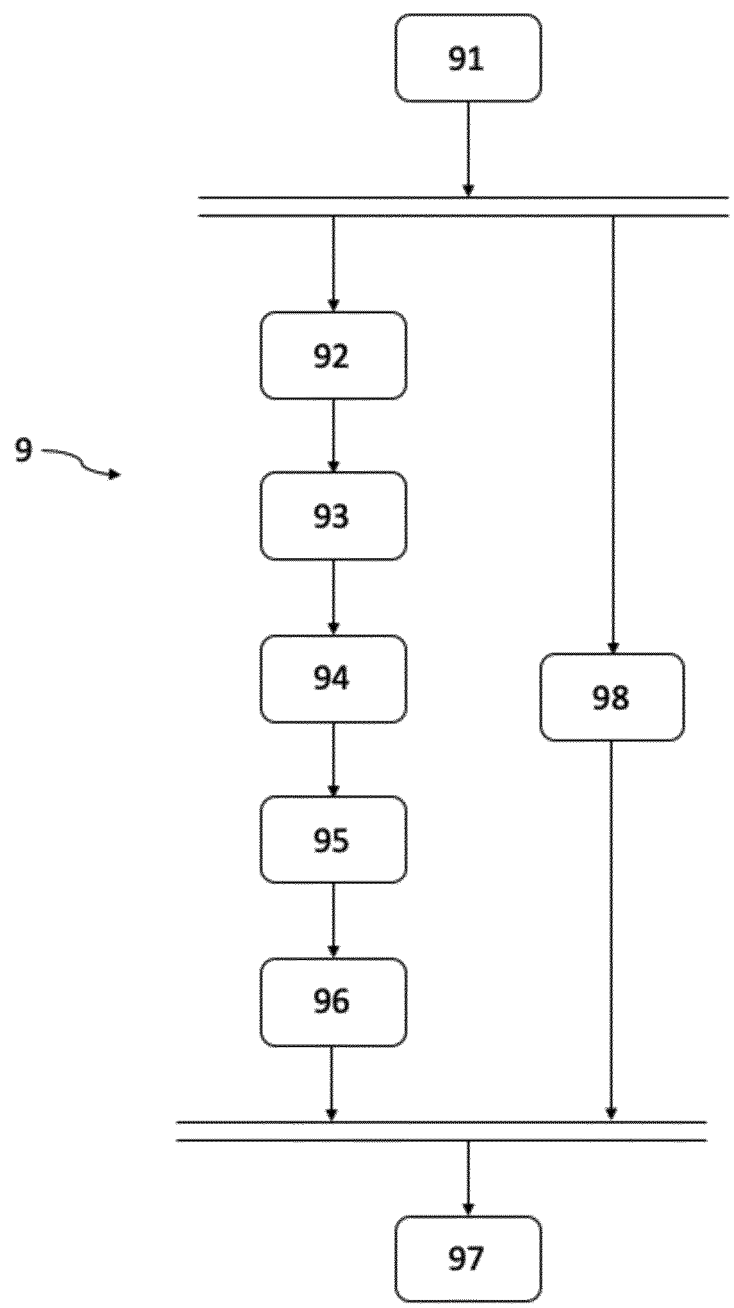
FIG. 23 illustrates a flowchart of a method for entering data on a touch panel of a terminal using a data entry device according to the proposed technique.

The present technique also relates to a method of entering data on a touch panel of a terminal by using the data entry device 1 for the visually impaired people described above. FIG. 23 shows a flowchart of this method.

Such a method 9 comprises:
  a step of laying 91, on a touch panel 21 of the terminal 2, a data entry device 1 as described previously;
  a step of establishing a capacitive connection 92, similar to an electrical connection, between the independent contact pads 121a, 121b and the touch panel 21 of the terminal 2 when the data entry device 1 is held, via the additional evacuation means 3, by a user on the touch panel 21 of the terminal,
  a step of detecting 93, by the terminal 2, the position and the orientation of the data entry device 1 based on a detection of the two contact pads 121a, 121b;
  a step of entering 94, by a user, data on the surface of the data entry device 1;
  a step of detecting 95, by the terminal 2, the data entered on the surface of the data entry device 1 based on a detection of at least one tap of a user's finger on one of the entry areas of the keyboard;
  a step of confirming 96, by a user, the entered data; and optionally, a step of removing 97 the data entry device 1 from the touch panel 21 of the terminal 2.

According to the proposed technique, a step of evacuating 98, via the additional evacuation means 3, the electric charges concentrated at the contact pads 121a, 121b is carried out as long as the data entry device 1 is affixed to the touch panel 21 of the terminal 2.

Preferably, the step of evacuating 98 the electric charges concentrated at the contact pads 121a, 121b is carried out towards the user's body, via the additional evacuation means 3, as long as the data entry device 1 is affixed and held, via the evacuation means 3, by the user on the touch panel 21 of the terminal 2.

This evacuation of the electric charges concentrated at the contact pads 121a, 121b via the additional evacuation means 3 is carried out additionally to the conventional evacuation of the electric charges via the data entry device during the data entry by the user.

The step of evacuating 98 the electric charges concentrated at the contact pads 121a, 121b is carried out in parallel, that is to say simultaneously, with the steps of establishing a capacitive connection 92, of detecting 93 the position and the orientation of the data entry device 1, of entering 94 the data by the user, of detecting the entered data and of confirming 65 the entered data.

The evacuation of the electric charges concentrated at the contact pads 121a, 121b allows eliminating the interference at these contact points so as to promote an optimal detection of the data entry device 1 by the terminal 2, when the data entry device 1 is affixed to the touch panel 21 to perform a data entry.

During the removal 97 of the data entry device 1 from the touch panel 21, the capacitive connection between the data entry device 1 and the touch panel 21 is broken. So there are no more electric charges concentrated at the contact pads 121a, 121b to be evacuated.

As described above, the evacuation of the electric charges is therefore done through the user's body, when the latter comes into contact with the additional evacuation means 3 which are present either in the form of holding prints 31a, 31b, or of a lever 36. More particularly, the evacuation of the electric charges takes place when the user holds the data entry device 1 through the evacuation means which, in these examples, are also means for gripping the data entry device 1.

In addition, according to the proposed technique, the confirmation 96 of the data entered by the user may be carried out in different ways.

One way of confirming the entered data conventionally consists in doing a tap on the confirm key 112-3 of the data entry device 1. However, this situation should be avoided so as not to make it easier for a malicious person to hack a confidential code. Indeed, an observer could deduce the key taps preceding a confirm tap, by deduction and knowledge of the respective locations of the different keys on a keyboard, and thus deduce the confidential code a posteriori.

Thus, in order to complicate the hacking, the confirmation may be done in a more secure way.

For example, the confirmation may be performed by removing the data entry device 1 from the touch panel 21. This removal of the device 1 leads to a detection, by the terminal, of the absence of the contact pads 121a, 121b, or indeed a non-detection of the contact pads 121a, 121b. The removal of the data entry device 1 therefore indicates to the terminal 2 that the entry of data by the user is finished.

Yet another way of confirming the entered data consists in making at least two quick/close contacts/taps ("double tap") on the touch panel 21 outside the surface of the data entry device 1. Other actions, performed by the user, may allow such confirmation.

Note that the entry of a key on the data entry device 1 may also be done by making two quick/close contacts on the touch panel 21, but in the surface of the data entry device 1 of course.

Other Aspects and Implementation Variants

FIGS. 12 to 15 illustrate implementation variants of the keyboard of the data entry device 1.

Figure 12:
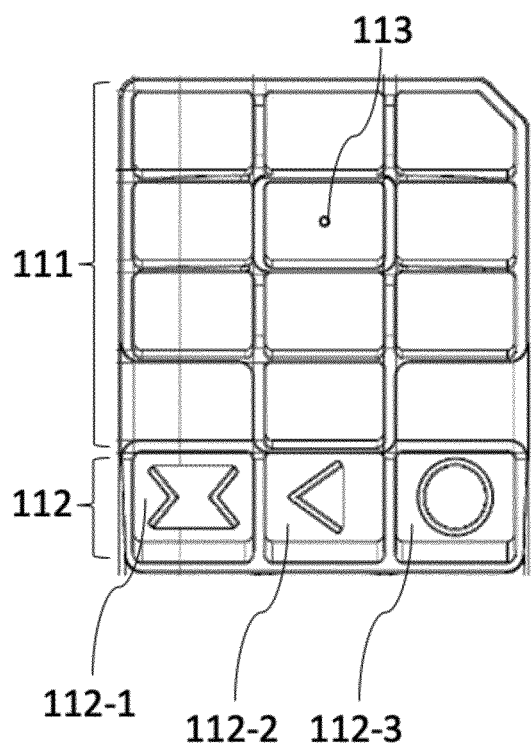
FIG. 12 illustrates a first variant of the matrix of entry areas forming a keyboard of a data entry device according to the first or the second embodiment.

More particularly, FIG. 12 illustrates a first embodiment of the keyboard in which the plate 10 has, at the keys of the first subset 111 of keys, a thickness configured to allow a detection of a finger by the touch panel when the data entry device 1 is affixed to the touch panel 21.

The keys of the second subset 112 have in turn patterns/shapes representative of a function which are recessed through the plate 10 so that the user's finger is directly in contact with the touch panel 21 when the data entry device 1 is affixed to the terminal 2.

These recessed keys highlight the remarkable edges of the patterns so as to allow an optimal identification, without possible error.

Thus, the plate 10 has a level change between the numeric keys 111 and the functional keys 112. This level change allows visually impaired people to easily identify the numeric keys and the functional keys.

Figure 13:
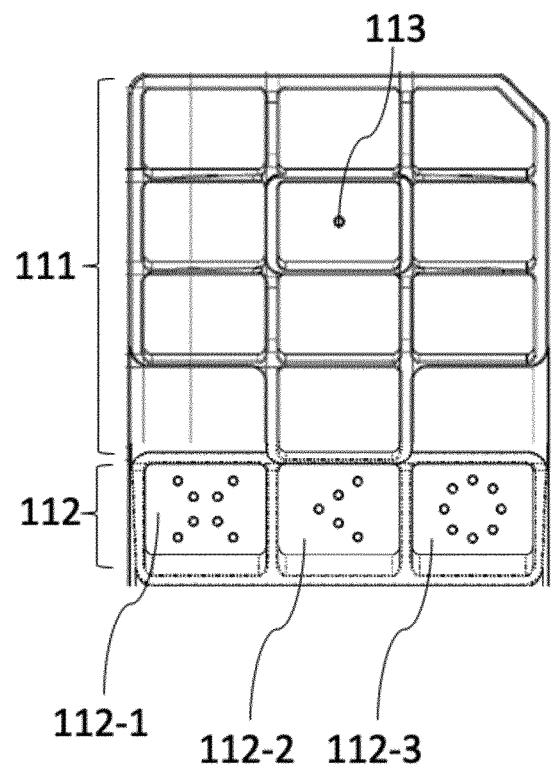
FIG. 13 illustrates a second variant of the matrix of entry areas forming a keyboard of a data entry device according to the first or the second embodiment.

In FIG. 13, the keys of the first subset are made identically to FIG. 12. These are the keys of the second subset 112 which differ. Indeed, the keys of the second subset 112 are no longer recessed but their patterns are made with dots in relief. The dots in relief are arranged specifically so that the user, even a novice, may recognize the different shapes of these keys 112.

Preferably, the keys of the second subset 112 are lower than the numeric keys, by approximately 0.5 to 1 mm for example, so as to easily distinguish them from the keys of the first sub-assembly 111. Although this is hardly perceptible, this difference in height still allows better perceiving the reliefs of the internal area of each key.

In another variant, not illustrated, the background of the function keys of the second subset 112 may be colored in order to allow visually impaired people to find his way around more easily. For example, the keys, depending on their function, have a red, yellow or green marking respectively. Other colors may of course be implemented.

In a well-known way, the symbols of the function keys of the second subset 112 have a specific function, namely: a cancellation function for the symbol/letter X, a correction function for the left-pointing arrow symbol and a confirm function for the circle symbol.

As described previously, each of these variants has, in the middle of the central key (generally the numeric key 5 of the keyboard), a pin 113 which allows a visually impaired user to find his way around the plate 10 of the data entry device 1.

Figure 14:
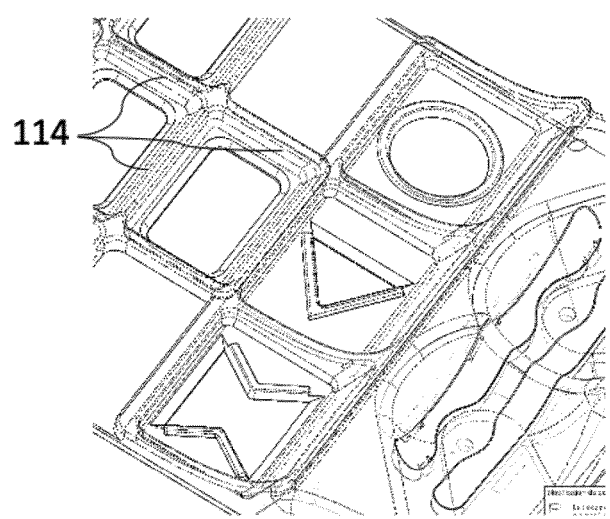
FIG. 14 is a partial view showing a third variant of the matrix of entry areas forming a keyboard of a data entry device according to the first or the second embodiment.
Figure 15:
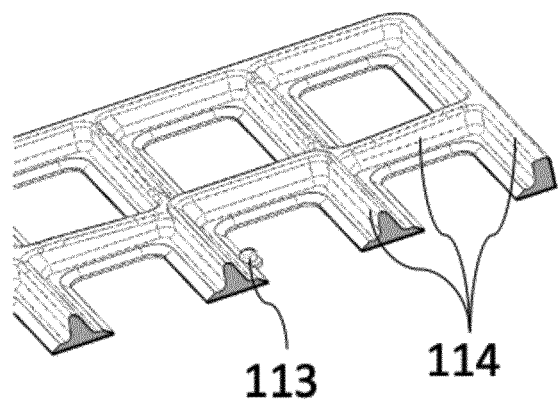
FIG. 15 is another view partially showing the third variant of the matrix of entry areas forming the keyboard of FIG. 14.

FIGS. 14 and 15 illustrate a variant in which the numeric keys of the first subset 111 of keys do not have a background. In other words, the plate 10 is hollow/crossing at these keys.

These hollow keys 111 allow reducing the distance between the fingers and the touch panel when the data entry device 1 is affixed to the touch panel 21. In this case, the user's fingers even come directly into contact with the touch panel 21 so as to improve the detection of the taps on the touch panel 21.

As illustrated in FIG. 15, the keys are then separated by profiles 114 which form one or several breadcrumbs so as to guide the user.

According to this approach, the pin 113 is then located on the left lateral edge of the central key of the first sub-assembly 111. The pin 113 still plays the same role of location aid for the user.

The variants described in relation to FIGS. 12 to 15 may be applied to the first and second embodiments described in detail above, and this without any particular restriction/limitation. A combination of these variants is also possible.

FIGS. 16 to 18 illustrate different implementations of the cushions 4 which allow holding in position, thanks to their adherent material, the plate 10 on the touch panel 21 of the terminal 2.

FIG. 16 illustrates the cushion 4 implemented in the first embodiment described above. The cushion 4 has a substantially rectangular shape and is placed between the two contact pads 121a, 121b on the lower face 12 of the plate 10. This position is optimal since the user taps on one of the prints 31a, 31b located substantially opposite the cushion 4. The data entry device 1 is therefore held in place in an optimal manner.

Preferably, this implementation favors the use of contact pads 121a, 121b manufactured from a flexible material in order to prevent the data entry device 1 from being hyperstatic.

In an embodiment variant illustrated in FIG. 17, the rectangular cushion 4 is replaced by two cushions 4 which are placed substantially in the middle of the length of the lower face 12 of the plate 10 and close to the lateral edges of the plate 10. More specifically, the cushions 4 are substantially located opposite the lower left 116a and right 116b corners of the first subset 111 of keys. This particular position of the two cushions 4 on the lower face 12 of the plate 10 allows ensuring an optimum adherence of the data entry device 1 to the touch panel 21.

FIG. 17 illustrates this implementation in relation to the first embodiment described. However, as illustrated in FIG. 11 in particular, the implementation of two cushions 4 according to this particular arrangement is also relevant in the case of the first and second embodiments.

Other variants (not shown) implementing more cushions 4, and according to different arrangements, on the lower surface 12 of the plate 10 so as to optimize the holding in position of the data entry device 1 on a touch panel are obviously possible, whether for the first or second embodiment described above.

The cushion 4 is preferably manufactured from a material that is particularly adherent and effective on the smooth surfaces, such as the glass of a touch panel for example.

For example, the material used may be a flexible material having a structure substantially identical to the legs of the gecko. Such a material has a plurality of flexible micro bristles on its surface. Thus, once the pressure is applied by the user to the plate 10, a retention/suction and a high shear resistance are observed, allowing effectively holding the data entry device 1 on the touch panel.

FIG. 18 illustrates another embodiment variant in which the plate 10 has, on its lower face 12 and at the angles situated close to the contact pads 121a, 121b, feet 41 generally flat, with a thickness between 0.1 and 0.4 mm, for example.

The feet 41 aim to guarantee that these are the contact pads 121a, 121b which bear on the touch panel 21, even if the plate 10 is a little bent for example. This avoids a limping of the entry device 1, whether the plate 10 is concave or convex.

In this example, the lower face 12 of the plate 10 comprises two cushions 4 located substantially in the middle of the length of the plate 10 and at the lateral edges of the latter, that is to say in a manner similar to the second embodiment described above.

In order to ensure a good adherence of the cushions 4 on the touch panel 21, the implementation of the feet 41 at the corners of the plate 10 allows tilting the data entry device 1 towards the cushions 4 in order to ensure an optimal bearing of the cushions 4 on the touch panel 21.

When the data entry device 1 is affixed to the touch panel 21 and the user holds the latter by tapping on one of the prints 31a, 31b, then the feet 41 allow a tilting which ensures an optimal contact of the contact pads 121a, 121b and the cushions 4 on the touch panel 21.

FIGS. 19 to 22 illustrate different examples of laying a data entry device 1 on a terminal 2.

Figure 19:
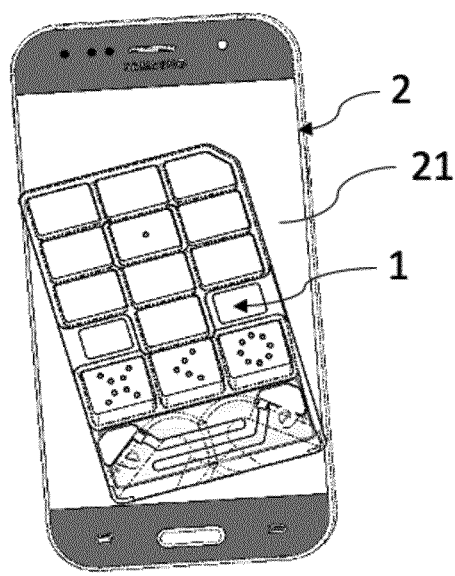
FIG. 19 is a front view showing an entry device according to the first embodiment affixed to a touch panel of a smartphone.

FIG. 19 illustrates an example of correct affixing of a data entry device 1 to the touch panel 21 of a terminal 2, which, in this example, is in the form of a smartphone. Indeed, as illustrated, the data entry device 1 is affixed to the touch panel and no part of the data entry device 1 extends out of the touch panel 21.

Thus, in this example, the data entry device 1 is correctly laid on the touch panel 21 and it may then be detected effectively by the terminal 2.

Figure 20:
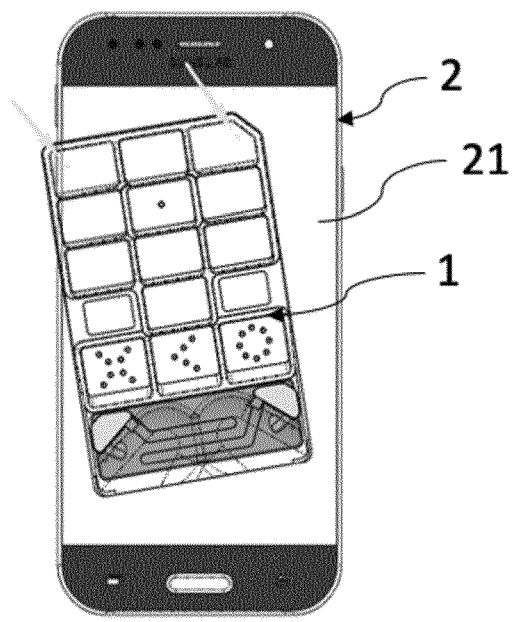
FIG. 20 is another front view showing an entry device according to the first embodiment affixed to a touch panel of a smartphone.

In FIG. 20, it is observed that the left upper corner of the data entry device 1 protrudes from the touch panel 21, that is to say that it extends out of the touch panel 21.

In this case, it is necessary to determine if the key located partially outside the touch panel may still be detected. For example, if at least 80% of the surface of the key is included in the touch panel 21, then it is estimated that the data entry device 1 is correctly positioned and that the entry of data via the data entry device 1 may be performed.

If, in the contrary case, less than 80% of the surface of a key is included on the touch panel, then it is estimated that the data entry device 1 is not correctly affixed and that it must be moved in order to be detected correctly. For example, an audible signal is emitted by the terminal 2 in order to indicate this fault to the user.

Figure 21:
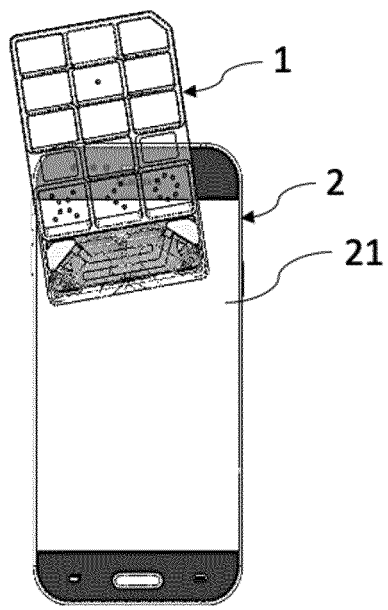
FIG. 21 is yet another front view showing an entry device according to the first embodiment affixed to a touch panel of a smartphone.

FIG. 21 illustrates an example in which the entry device 1 is not correctly laid on the touch panel 21 of the terminal. In this case, although the contact pads 121a, 121b are detected by the terminal 2, the latter is capable of determining that the data entry device 1 is not placed correctly. An audible signal is therefore emitted to warn the user.

Figure 22:
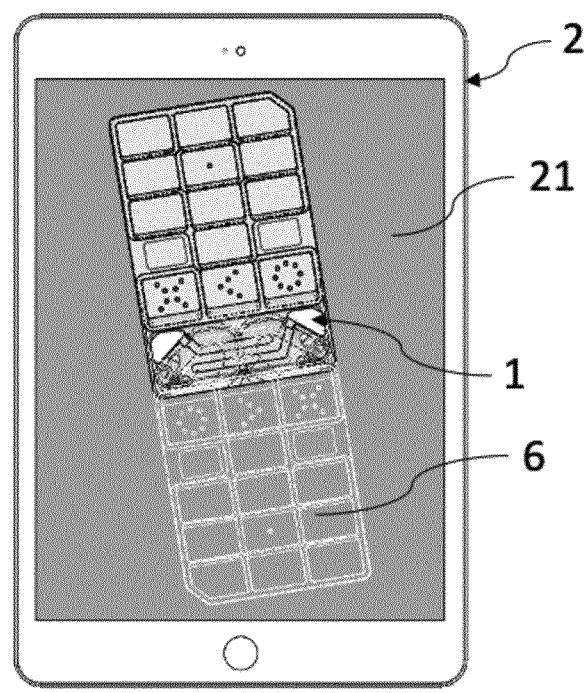
FIG. 22 is a front view showing an entry device according to the first embodiment affixed to a touch panel of a touch tablet.

FIG. 22 illustrates an example in which the data entry device 1 is laid on the touch panel 21 of a terminal 2 in the form of a touch tablet. In this case, the touch panel 21 has dimensions substantially greater than those of the data entry device 1. The user therefore has greater freedom to lay the data entry device 1 on the touch panel 21.

In this same figure another possibility 6 of laying the data entry device 1 on the touch panel 21 is illustrated in transparency. The terminal 2 has detection means enabling it to precisely detect the position and the orientation of the data entry device 1 in order to then detect a user's tap when entering a confidential code, for example. In particular, these detection means are capable of determining the orientation (landscape, portrait or inverted portrait) of the terminal 2 so as to select the optimal orientation of the data entry device 1 on the touch panel 21.

In another embodiment (not shown), the additional means for evacuating 3 the electric charges concentrated at the contact pads 121a, 121b when the data entry device 1 is affixed to the touch panel 21 of a terminal 2 are in the form of a cable connecting the data entry device 1 to the ground of the terminal 2.

For example, a cable of the USB, Lightning ° or audio jack type may be implemented. Thus, when the data entry device 1 is affixed to the touch panel 21, the electric charges concentrated at the contact pads 121a, 121b are evacuated via the cable so as to allow an optimum detection of the contact pads 121a, 121b.

In a variant of the first embodiment (not shown), rather than implementing two conductive tabs 32a, 32b each connecting a contact pad 121*a*, 121*b* to the two prints 31*a*, 31*b*, it is possible to implement a conductive tab electrically connecting a contact pad to one print only. In this case, it is necessary to implement four conductive tabs, each tab connecting a contact pad to a print.

More precisely, this variant consists in implementing a first tab connecting the left print 32*a* and the left contact pad 121*b*, a second tab connecting the right print 32*b* and the left contact pad 121*b*, a third tab connecting the left print 32*a* and the right contact pad 121*a* and a fourth tab connecting the right print 32*b* and the right contact pad 121*a*.

In yet another variant of the first and second embodiments (not shown), it is possible to implement a third independent contact pad so as to form a triangle of contact pads detectable by the touch panel 21 of the terminal when the data entry device 1 is affixed to the latter. This variant allows easily detecting the orientation of the data entry device 1.

According to this variant, the third contact pad must also be electrically connected to the additional means 3 for evacuating the electric charges.

The invention claimed is:

1. A data entry device intended to be affixed to a touch panel of a terminal, said touch panel being capacitive, said data entry device comprising:
   a substantially parallelepipedal plate comprising a lower face, substantially planar, for affixing the device to the touch panel, and an upper face comprising a matrix of entry areas forming a keyboard, the entry areas being configured to allow a detection of a user's finger by the touch panel when the device is affixed to the touch panel;
   at least two contact pads independent of each other, that is to say electrically insulated in relation to each other, electrically conductive and arranged on the lower face;
   wherein said contact pads are each electrically connected to additional means for evacuating, towards the outside of the touch panel, the electric charges concentrated at the contact pads when said data entry device is affixed and held on said touch panel,
   wherein said additional evacuation means evacuate, towards the user's body, the electric charges concentrated at the contact pads when said data entry device is affixed and held, via the additional evacuation means, by the user on said touch panel of a terminal,
   wherein said additional means for evacuating the electric charges comprise at least one surface for holding, by a user's finger, the entry device on the touch panel, said at least one holding surface being electrically connected to each of said at least two contact pads, respectively via a conductive tab, and
   wherein said additional means for evacuating the electric charges comprise a first surface and a second surface for holding the data entry device on the touch panel, said first and second holding surfaces respectively being in the form of a cavity shaped according to a print of a left thumbprint and according to a print of a right thumbprint.

2. The data entry device according to claim 1, wherein said at least two contact pads are respectively electrically connected to said additional evacuation means by an electrical resistor.

3. The data entry device according to claim 1, wherein said conductive tabs each extend through said first and second surfaces for holding the data entry device.

4. The data entry device according to claim 1, wherein said first holding surface is electrically connected to a first contact pad via a first conductive tab and to a second contact pad via a second conductive tab and said second holding surface is electrically connected to said first contact pad via said first conductive tab and to said second contact pad via said second conductive tab.

5. The data entry device according to claim 1, wherein said additional means for evacuating the electric charges comprise a lever operable by a user and electrically connected with said at least two contact pads so as to evacuate the electric charges concentrated at said contact pads when said data entry device is affixed to said touch panel.

6. The data entry device according to claim 1, wherein said matrix of entry areas forming a keyboard comprises a first subset of ten numeric keys and a second subset of three function keys, the symbols of said function keys being shaped in negative relief on said upper face to said lower face.

7. The data entry device according to claim 1, wherein said data entry device further comprises, on its lower face, means for reversibly adhering/securing the entry device on the terminal.

8. The data entry device according to claim 7, wherein said reversible adhesion/securing means are in the form of at least one cushion manufactured from a flexible and adherent material.

9. A method for entering data on a touch panel of a terminal, said method comprising:
   a step of laying, on a touch panel of said terminal, a data entry device according to claim 1;
   a step of establishing a capacitive connection between said independent contact pads and said touch panel of said terminal,
   a step of detecting, by the terminal, the position and the orientation of said data entry device based on a detection of said at least two contact pads;
   a step of entering, by a user, data on the surface of said data entry device;
   a step of detecting, by the terminal, the data entered on the surface of said data entry device based on a detection of at least one tap of a finger of said user on one of the entry areas forming a keyboard; and
   a step of confirming, by a user, the entered data;
   wherein it further comprises a step of evacuating, via additional evacuation means, the electric charges concentrated at the contact pads as long as said data entry device is affixed to said touch panel of the terminal.

10. The method according to claim 9, wherein said step of evacuating the electric charges concentrated at the contact pads is carried out towards the user's body, via the additional evacuation means, as long as the data entry device is affixed and held, via the additional evacuation means, by the user on the touch panel of the terminal.

* * * * *